July 12, 1949.  P. E. HAWKINSON  2,476,146
METHOD OF PRODUCING SKID-RESISTANT TREADS
Filed Oct. 17, 1947  2 Sheets-Sheet 1
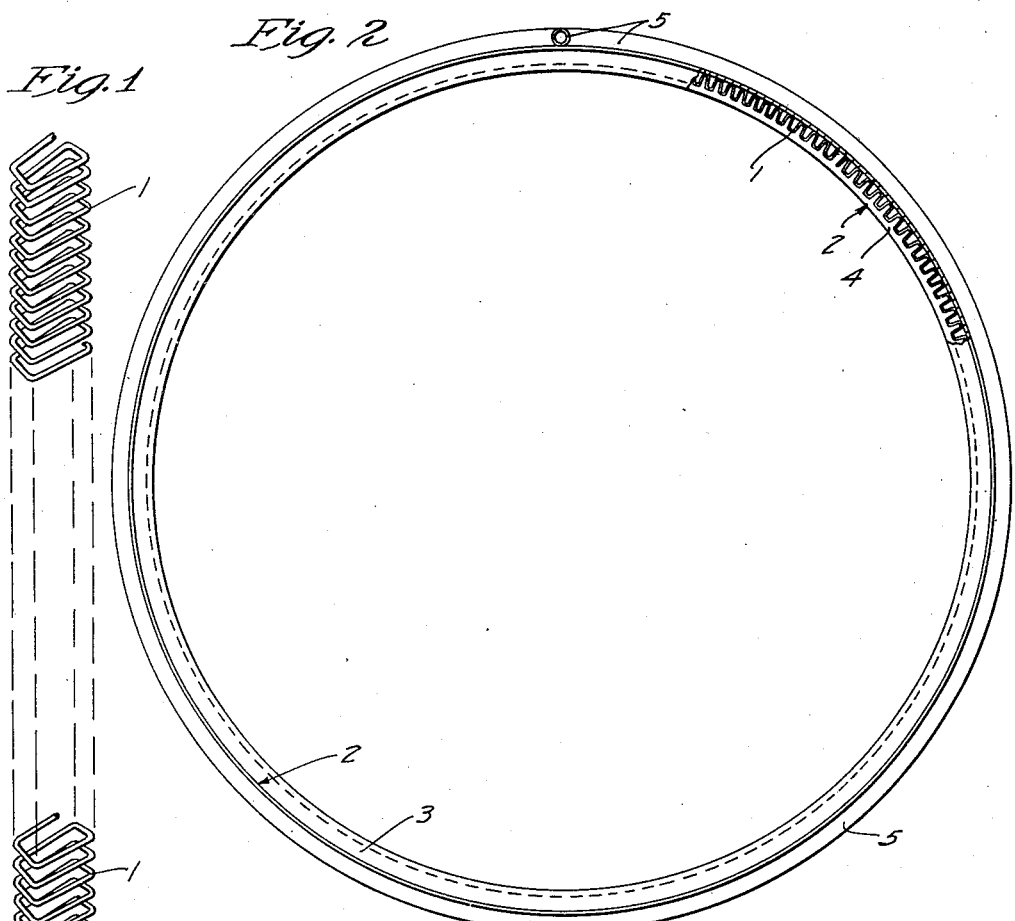
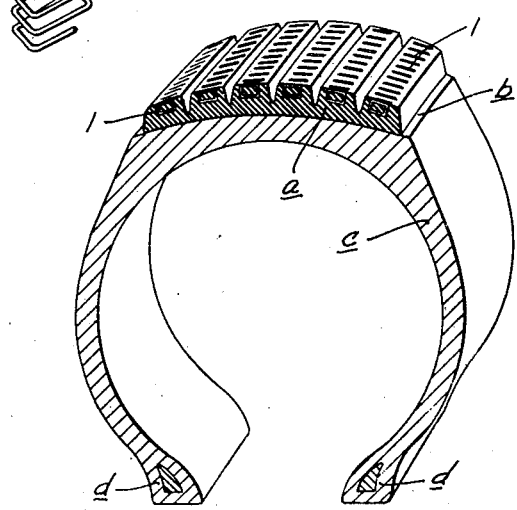
Inventor
Paul E. Hawkinson
By his Attorneys
Merchant & Merchant July 12, 1949.  P. E. HAWKINSON  2,476,146
METHOD OF PRODUCING SKID-RESISTANT TREADS
Filed Oct. 17, 1947  2 Sheets-Sheet 2
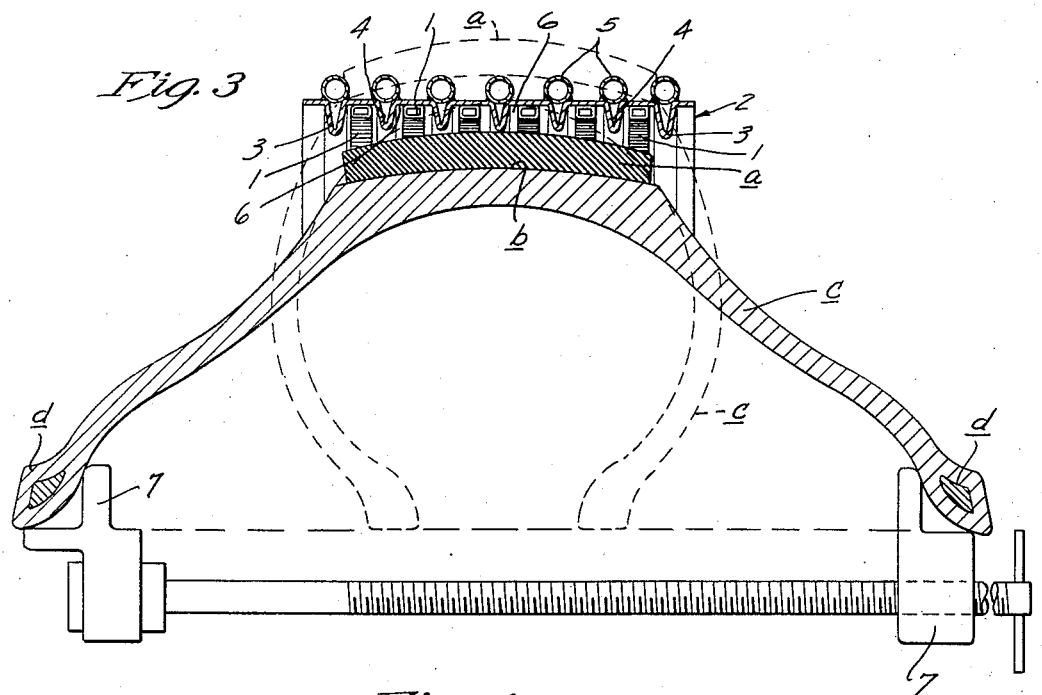
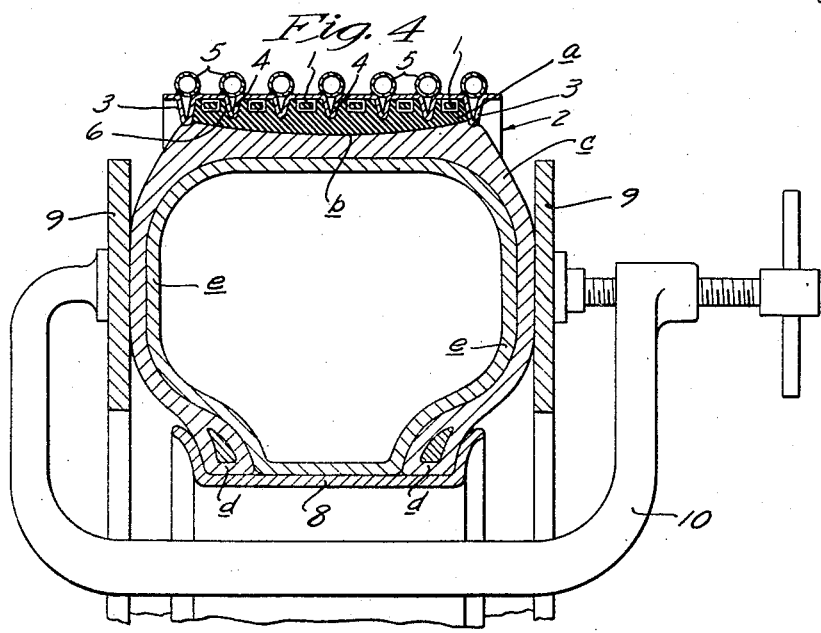
Inventor
Paul E. Hawkinson
By his Attorneys
Merchant & Merchant Patented July 12, 1949

2,476,146

UNITED STATES PATENT OFFICE 2,476,146

METHOD OF PRODUCING SKID-RESISTANT TREADS

Paul E. Hawkinson, Minneapolis, Minn., assignor to Paul E. Hawkinson Company, Minneapolis, Minn., a corporation of Minnesota Application October 17, 1947, Serial No. 780,447

1 Claim. (Cl. 154—14)

My invention relates to a novel method of producing a skid resistant tread for pneumatic tires and, more specifically, to a novel method of placing one or more coils of wire completely around the tread, immediately below the road-contacting surface thereof.

I recognize that broadly this is not new. For many years past, pneumatic tires have been produced which have coiled wire elements extending throughout the circumference of the tread. However, and without exception, the treads in which such wires have been placed, were cured to the tire when the tire was radially expanded to its maximum or inflated radius. Such wire treads have never proved satisfactory, due to the fact that when the tread, which is cured at the inflated radius, is deformed by contact with the road under load to the so-called "rolling radius," the crunching action of the tread as it is being displaced and reshaped causes the wire particles to break and work loose from the tread, thus rendering it ineffective as a non-skid tread thereafter.

My invention relates to the incorporation of coiled wire into so-called "short" or "rolling radius" treads and more particularly to the type of rolling radius treads produced by the well-known Hawkinson method, broadly described and claimed in my earlier patent Re. 21,956, and will become apparent from the following detailed specification, appended claim, and attached drawings.

The primary object of my invention is the provision of a novel method of producing a skid resistant tread having coils of resilient wire extending throughout the circumference of the tread and which is simple and fool-proof, and which method will produce a tread in which the wire elements will be retained within the tread until completely worn out by contact with the road.

Referring to the drawings, wherein like characters indicate like parts throughout the several views:

Fig. 1 is a perspective view of a normally flat resilient coil of wire, such as used in my novel process;

Fig. 2 is a side elevation of a tire mold, some parts being broken away, showing a coil of wire inserted therein, and illustrating one step of my novel method;

Fig. 3 is a sectional view illustrating in dotted lines a further step in my novel method and by full lines a still further step in my novel method;

Fig. 4 is a sectional view showing a still further step in my novel method; and

Fig. 5 is a fragmentary perspective view showing a tire having thereon a tread produced by my novel method.

Referring with greater particularity to the drawings, the numeral 1 illustrates a coil of wire preferably and as shown being rectangular in form. The numeral 2 indicates a tire retreading mold of the type disclosed and broadly claimed in my earlier Patent No. 1,917,267, which is preferably formed from sheet metal, is cross-sectionally flat, and is formed to provide confining flanges 3 adjacent its opposite edges and a plurality of laterally-spaced circumferentially-extended, tread design-forming ribs 4, which together define channel 6. Secured to the outer surface of the molds 2, as by solder or the like, is a steam conduit 5.

The first step of my novel method is the deforming of the normally straight coil of wire 1 into a circle, which has a diameter less than the internal diameter of the mold 2. This circular coil of wire 1 is then placed within a mold 2, at which point it is allowed to come into contact with the mold throughout its entire internal periphery, by virtue of the tendency of the coil to assume its normally straight condition. This tendency retains the coil 2 in a set position within the mold and enables the mold to be lifted about without fear of the coil being dislodged therefrom. This is very important in the practicing of the next step of my process as will hereinafter become apparent. As shown, a coil of wire 1 may be placed within each of the channels 6 formed by confining flanges 3 and the ribs 4.

I next apply a strip of uncured tread rubber, indicated by the letter a, to the buffed and cemented crown surface b of a pneumatic tire c, which is of larger circumference than the matrix 2 and which has a rolling radius approximating the internal diameter of said matrix, as indicated in Fig. 3. The strip of uncured tread rubber a extends completely around the circumference of tire c.

I next reduce the circumferential and diametrical measurements of the tire c to less than that of the internal diameter of matrix 2, by spreading the beads d thereof laterally by any suitable means, such as by circumferentially spaced spreaders 7.

The matrix 2, with the desired number of coil springs 1 retained therein, is then slipped over the crown of the tire casing c, as indicated by full lines in Fig. 3. The beads d are then allowed to assume a normal position by removal of the spreading devices 7, with the result that the newly applied strip of tread material a is forced into contact with the ribs 4. An inner tube e in then put into the casing c, and a rim 8 is mounted thereon, as indicated in Fig. 4. Air is then applied to the inner tube e to expand the casing c with great force against the retreading matrix 2 and the coils of wire 1. Heat is then applied to the endless heating coil 5 to vulcanize the tread strip a to the crown b, also as shown in Fig. 4. It will be there observed that the coils of wire 1 have been pressed into the tread stock a during its plastic stage so that each thereof becomes imbedded in the tread immediately below the road-engaging surface thereof, while the new tread is at its approximate rolling radius.

Preferably and as shown, side plates 9 are applied by means of C-clamps or the like 10 to opposite side walls of the tire to alleviate the strain thereon during vulcanization. When the tire carcass c with the tread strip a cured thereon is removed from the matrix 2, it appears substantially as shown in Fig. 5. As above indicated, when the coils of wire 1 are placed within a tread by the novel method above-described, they have much less tendency to break up and become dislodged from the tread than where similar coils of wire are placed within treads which are cured to the inflated radius—due to the fact that treads cured to the rolling radius are not crunched or materially displaced upon contact with the road under load. On the contrary, treads cured to the rolling radius are merely pushed back to the position in which they were cured.

What I claim is:

The method of producing a skid-resistant tread for a pneumatic tire which comprises deforming a normally straight coil of resilient wire to form a circular loop of less diameter than a given annular matrix, placing said looped coil within said annular matrix, permitting said looped coil to expand by virtue of its tendency to straighten out, whereby to bring about frictional engagement therebetween and the internal peripheral surface of said matrix, applying uncured tread material to the entire crown surface of a pneumatic tire which has a radius greater than that of said matrix, spreading the beads of said tire to reduce the diameter thereof to less than that of said matrix, placing said tire within said matrix, permitting said tire to expand by releasing the beads thereof, whereby the uncured tire tread material is forced into contact with the matrix and the coil wire contained therein, and applying heat to the matrix to cure the tread rubber at the radius of said matrix with the coiled wire imbedded therein.

PAUL E. HAWKINSON.

REFERENCES CITED

The following references are of record in the file of this patent:

UNITED STATES PATENTS

| Number | Name | Date |
|---|---|---|
| Re. 21,956 | Hawkinson | Nov. 25, 1941 |
| 1,216,654 | Burke | Feb. 20, 1917 |
| 1,778,183 | Burke | Oct. 14, 1930 |
| 2,110,293 | Fisher | Mar. 8, 1938 |
| 2,237,819 | Hawkinson | Apr. 8, 1941 |
| 2,396,059 | Roberts | Mar. 5, 1946 |